(12) United States Patent
Raisch et al.

(10) Patent No.: US 11,036,494 B2
(45) Date of Patent: Jun. 15, 2021

(54) EMBEDDED APPLICATION UPGRADE

(71) Applicant: International Business Machines Corporation, Armonk, NY (US)

(72) Inventors: Christoph Raisch, Gerlingen (DE); Sudhir Alluri, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 54 days.

(21) Appl. No.: 16/361,926

(22) Filed: Mar. 22, 2019

(65) Prior Publication Data

US 2020/0301699 A1 Sep. 24, 2020

(51) Int. Cl.
*G06F 9/44* (2018.01)
*G06F 8/656* (2018.01)
*H04L 29/06* (2006.01)
*H04L 29/08* (2006.01)
*G06F 9/48* (2006.01)

(52) U.S. Cl.
CPC ............ *G06F 8/656* (2018.02); *G06F 9/4856* (2013.01); *H04L 67/34* (2013.01); *H04L 69/161* (2013.01)

(58) Field of Classification Search
None
See application file for complete search history.

(56) References Cited

U.S. PATENT DOCUMENTS

| | | | |
|---|---|---|---|
| 8,352,933 B2 | 1/2013 | Amann | |
| 8,935,689 B2 * | 1/2015 | Evans | G06F 8/654 717/170 |
| 9,626,180 B2 * | 4/2017 | Barrat | G06F 9/5077 |
| 9,778,989 B2 | 10/2017 | Arroyo | |
| 2016/0092203 A1 * | 3/2016 | Filali-Adib | G06F 8/656 717/171 |
| 2018/0088934 A1 | 3/2018 | Mencias | |
| 2019/0087118 A1 * | 3/2019 | Makin | G06F 3/0604 |

OTHER PUBLICATIONS

Kyong et al,. "LDU: A Lightweight Concurrent Update Method With Deferred Processing for Linux Kernel Scalability", Proceedings of the 13th IASTED International Conference, Feb. 15-16, 2016 Innsbruck, Austria, Parallel and Distributed Computing and Networks (PDCN 2016), 8 pages.

Muehlbach et al., "Concurrent driver upgrade: Method to eliminate scheduled system outages for new function releases", IBM J. Res. & Dev. vol. 51 No. 1/2 Jan./Mar. 2007, 9 pages.

* cited by examiner

*Primary Examiner* — Anna C Deng
(74) *Attorney, Agent, or Firm* — Joseph P. Curcuru; Gilbert Harmon, Jr.

(57) ABSTRACT

Embodiments describe an approach for improving for improving application upgrade by minimizing blackout time for a single partition kernel. Embodiments send a command to a second core to load a new code load into a second portion of a memory and to execute the new code load, and instruct an old code load, executing on a first core, to save a process state and TCP connection state in a shared memory. Additionally, embodiments, instruct the new code load to read the process state and the TCP connection state from the shared memory, receive a notification from the new code load that the new code load is active and processing client requests, and instruct the old code load to terminate and remove the old code load from a first portion of the memory.

17 Claims, 4 Drawing Sheets

EMBEDDED APPLICATION UPGRADE

BACKGROUND OF THE INVENTION

The present invention relates generally to the field of data storage and application upgrading, and more particularly minimizing the blackout-time for single partition kernel based embedded application upgrade.

A kernel is a replaceable software that interfaces with the hardware in a computer. A kernel is responsible for interfacing all of your applications that are running in "user mode" down to the physical hardware, and allowing processes, known as servers, to get information from each other using inter-process communication (IPC). On most systems, a kernel is one of the first programs loaded on start-up (after the bootloader). It handles the rest of start-up as well as input/output requests from software, translating them into data-processing instructions for the central processing unit. The kernel handles memory and peripherals like keyboards, monitors, printers, and speakers. In general, most kernels fall into one of three types: monolithic, microkernel, or hybrid.

SUMMARY

Embodiments of the present invention disclose a method, a computer program product, and a system for improving application upgrade by minimizing blackout time for a single partition kernel, the method comprising: sending, by an orchestrator, a command to a second core to load a new code load into a second portion of a memory and to execute the new code load; instructing, by the orchestrator, an old code load, executing on a first core, to save a process state and TCP connection state in a shared memory; instructing, by the orchestrator, the new code load to read the process state and the TCP connection state from the shared memory; receiving, by the orchestrator, a notification from the new code load that the new code load is active and processing client requests; and instructing, by the orchestrator, the old code load to terminate and remove the old code load from a first portion of the memory.

DETAILED DESCRIPTION

Embodiments of the present inventing minimize blackout-time for a single partition kernel based embedded application upgrade to enable a non-disruptive code load update. Embodiments of the present invention concurrently update both the application and kernel without disrupting the connected transmission control protocol (TCP) clients. Embodiments of the present invention can be used in conjunction with new approaches to achieve the goal of non-disruptive code load update. In various embodiments, resources can be allocated to one or more cores to execute one or more code loads independently. It should be noted that a code load comprises both a kernel and an application.

Embodiments of the present invention improve the art by enabling an application and a kernel to concurrently update without disrupting the connected TCP client. Embodiments of the present invention improve the art of single partition kernel based embedded application upgrade by loading code in sequence using a second core to execute the new code in parallel with the old code; replacing the old application; triggering quiesce enabling the application to transition and restart, enabling the triggering and launching of the new application, while switching over the old application, via switch over; resyncing to the hardware data then triggering and activating the new application. With the new approach the hardware queue is enabled to run while the new application syncs up with the switchover. Additionally, embodiments of the present invention improve the current art by concurrently updating the user space application and the kernel. Furthermore, embodiments of the present invention improve the current art by transferring the process state and the TCP connection data using shared data memory.

Figure 1A:
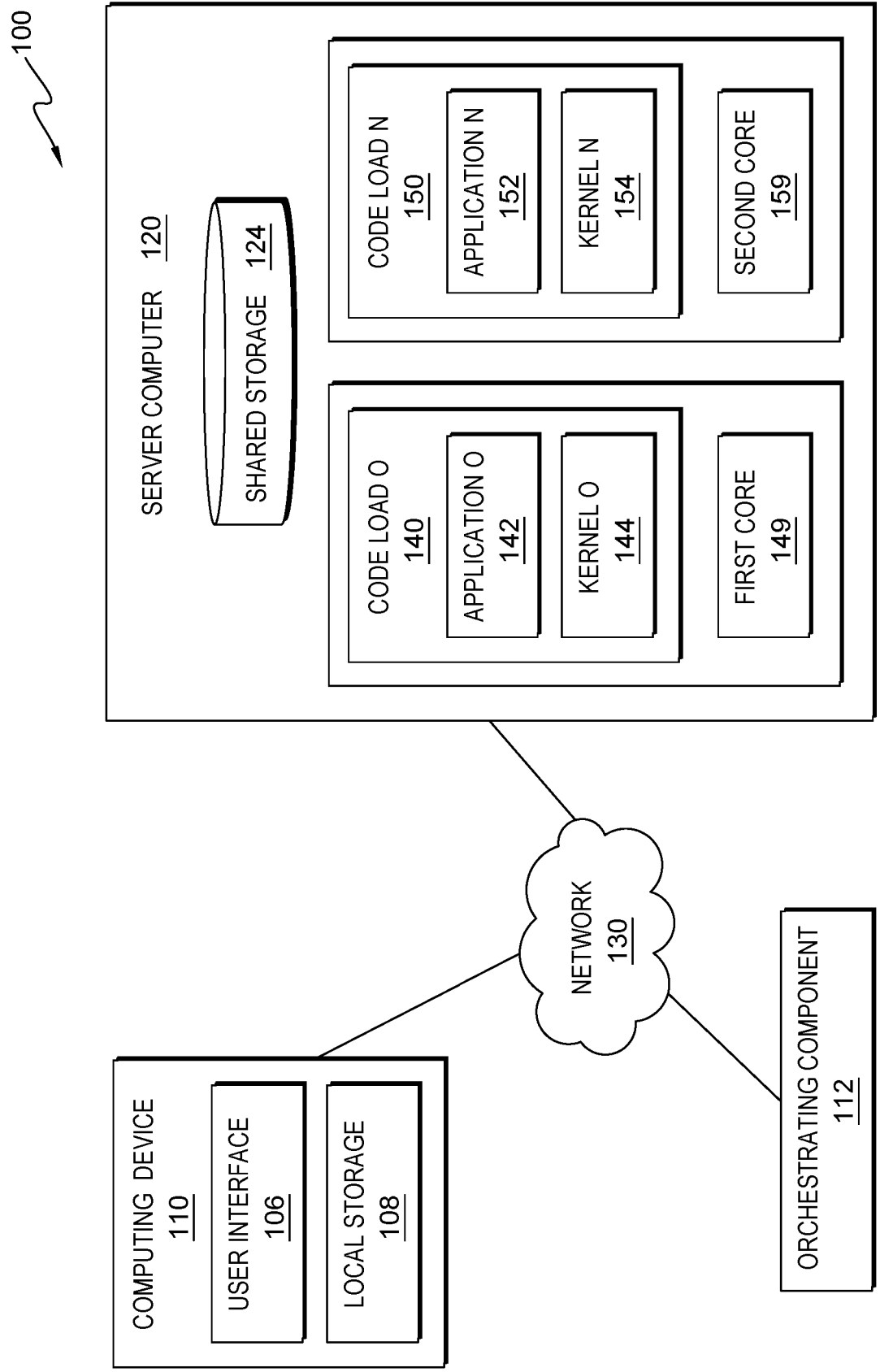
FIG. 1A is a functional block diagram illustrating a distributed data processing environment, in accordance with an embodiment of the present invention.

FIG. 1A is a functional block diagram illustrating distributed data processing environment 100, in accordance with an embodiment of the present invention. Distributed data processing environment 100 includes Computing Device 110, orchestrating component (OC) 112, and Server Computer 120 interconnected over Network 130. Network 130 can be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and can include wired, wireless, or fiber optic connections. Network 130 can include one or more wired and/or wireless networks that can receive and transmit data, voice, and/or video signals, including multimedia signals that include voice, data, text and/or video information. In general, Network 130 can be any combination of connections and protocols that will support communications between Computing Device 110, OC 112, Shared Storage 124, and Server Computer 120, and any other computing devices and/or storage devices (not shown in FIG. 1A) within distributed data processing environment 100. FIG. 1A provides only an illustration of one implementation and does not imply any limitations with regard to the environments in which different embodiments can be implemented. Many modifications to the depicted environment can be made by those skilled in the art without departing from the scope of the invention as recited by the claims.

In various embodiments, Computing Device 110 can be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), and/or any programmable electronic computing device capable of communicating with various components and devices within distributed data processing environment 100, via Network 130 or any combination therein. In general, Computing Device 110 can be representative of any programmable computing device or a combination of programmable computing devices capable of executing machine-readable program instructions and communicating with users of other computing devices via Network 130 and/or capable of executing machine-readable program instructions and communicating with Server Computer 120.

In other embodiments, Computing Device 110 can represent any programmable electronic computing device or combination of programmable electronic computing devices capable of executing machine readable program instructions, manipulating executable machine-readable instructions, and communicating with Server Computer 120 and other computing devices (not shown) within distributed data processing environment 100 via a network, such as Network 130. Computing device 110 can include an instance of user interface (UI) 106 and/or Local Storage 108. In various embodiments, not depicted in FIG. 1A, Computing Device 110 can have one or more user interfaces. In other embodiments, not depicted in FIG. 1A environment 100 can comprise one or more computing devices, one or more server computers, and/or one or more networks.

User interface (UI) 106 provides an interface to OC 112 on Server Computer 120 via Network 130 for a user of Computing Device 110. Computing device 110, via user interface 106, can enable a user and/or a client to interact with OC 112 and/or Server Computer 120 in various ways, such as sending program instructions, receiving program instructions, sending and/or receiving messages, updating data, sending data, inputting data, editing data, collecting data, and/or receiving data. In one embodiment, UI 106 can be a graphical user interface (GUI) or a web user interface (WUI) and can display text, documents, web browser windows, user options, application interfaces, and instructions for operation. UI 106 can include information (such as graphic, text, and sound) a program presents to a user and control sequences the user employs to control the program. In another embodiment, UI 106 can be a mobile application software providing an interface between a user of Computing Device 110 and Server Computer 120. Mobile application software, or an "app," can be a computer program designed to run on smart phones, tablet computers and other computing devices. In an embodiment, UI 106 can enable the user of Computing Device 110 to send data, input data, edit data (annotations), collect data and/or receive data.

Server computer 120 can be a standalone computing device, a management server, a web server, a mobile computing device, one or more client servers, or any other electronic device or computing system capable of receiving, sending, and processing data. In other embodiments, Server Computer 120 can represent a server computing system utilizing multiple computers such as, but not limited to, a server system, such as in a cloud computing environment. In another embodiment, Server Computer 120 can represent a computing system utilizing clustered computers and components (e.g., database server computers, application server computers, etc.) that act as a single pool of seamless resources when accessed within distributed data processing environment 100. Server computer 120 can include internal and external hardware components, as depicted, and described in further detail with respect to FIG. 3.

Each of Shared Storage 124 and Local Storage 108 can be a data/knowledge repository and/or a database that can be written and/or read by one or a combination of OC 112, Server Computer 120 and Computing Device 110. In the depicted embodiment, Shared Storage 124 resides on Server Computer 120 and Local Storage 108 resides on Computing Device 110. In another embodiment, Shared Storage 124 and/or Local Storage 108 can reside elsewhere within distributed data processing environment 100, provided that each can access and is accessible by Computing Device 110 and Server Computer 120. Shared storage 124 and/or Local Storage 108 can each be implemented with any type of storage device capable of storing data and configuration files that can be accessed and utilized by Server Computer 120, such as a database server, a hard disk drive, or a flash memory. In other embodiments, Shared Storage 124 and/or Local Storage 108 can each be a hard drive, a memory card, a computer output to laser disc (cold storage), and/or any form of data storage known in the art. In some embodiments, Shared Storage 124 and/or Local Storage 108 can each be one or more cloud storage systems and/or databases linked to a cloud network. In various embodiments, Shared Storage 124 can access, store, and/or house application data, hardware data, TCP shared data, and/or data shared throughout environment 100 (e.g., shared data memory). In some embodiments, Shared Storage 124 can be a synchronized shared memory. In various embodiments, Shared Storage 124 and/or Local Storage 108 can each have one or more portions of memory (e.g., a first portion and a second portion of memory).

In various embodiments, Code Load O 140 is executed on First Core 149 located on Server Computer 120. In various embodiments, Code Load N 150 is executed on Second Core 159 located on Server Computer 120. In other embodiments, Code Load O 140 and Code Load N 150 can be located anywhere in distributed data processing environment 100. In various embodiments, First Core 149 can represent one or more old cores, wherein the one or more old cores are being updated by one or more new cores, and/or the one or more old cores are associated with one or more old code loads, one or more old applications, and/or one or more old kernels that are being updated by one or more new code loads, one or more new applications, and/or one or more new kernels. It should be noted that term "new" means a newer version of an older version of a code load (e.g., application and/or kernel) that is currently running. For example, an old code load is replaced by a newer version of the code load (e.g., a next code load). In various embodiments, Second Core 159 can represent one or more new cores, wherein the new core is updating and/or replacing one or more old cores, and/or the one or more new cores is associated with one or more new code loads, one or more new applications, and/or one or more new kernels that are updating and/or replacing the one or more old code loads, one or more old applications, and/or one or more old kernels.

In various embodiments, Code Load O 140 represents one or more old code loads and Code Load N 150 represents one or more new code loads that is updating both one or more applications and/or one or more kernels and/or replacing Code Load O 140. In various embodiments, Application O 142 and Kernel O 144 are executed on Code Load O 140. In other embodiments Application O 142 and Kernel O 144 can be anywhere in distributed data processing environment 100. In various embodiments, Kernel O 144 is an old kernel that is being updated by a new kernel (e.g., Kernel N 154). In various embodiments, Kernel O 144 can house one or more TCP stacks and one or more device drivers associated with one or more old code loads. In various embodiments, Application N 152 and Kernel N 154 are executed on Code Load N 150. In other embodiments Application N 152 and Kernel N 154 can be anywhere in distributed data processing environment 100.

In various embodiments, Kernel N 154 can be a new kernel that is replacing an old kernel (e.g., Kernel O 144), via an update. In various embodiments, Kernel N 154 can house one or more TCP stacks and one or more device drivers associated with one or more new code loads. In various embodiments, Application O 142 can represent one or more old applications and Application N 152 can represent one or more new applications that can update one or more old applications (e.g., Application O 142). In various embodiments, First Core 149 and Second Core 159 are housed on Server Computer 120. In other embodiments, First Core 149 and Second Core 159 can be hosed on another server computer within distributed data processing environment 100. In various embodiments, the orchestration between Code Load O 140 and Code Load N 150 can be done by a third-party entity running on a separate core or by one of the code loads (Code Load O 140 or Code Load N 150) in a master-slave mode. In various embodiments, OC 112 can separate the memory for each core. In various embodiments, First Core 149 and Second Core 159 can have separate source files.

In the depicted embodiment, OC 112 is a standalone component. In various embodiments, OC 112 can be on one or more server computers 120 (e.g., clients/client computers). In other embodiments, OC 112 can be on one or more Computing Device 110. In other embodiments, OC 112 can instruct and/or communicate with one or more client computers and/or upgrade one or more Server Computer 120 utilizing at least two cores. In various embodiments, OC 112 can concurrently update both Application O 142 and Kernel O 144 without disrupting connected TCP clients through a checkpoint/restore in user space (CRUI) tool, not depicted in FIG. 1A. In various embodiments, OC 112 can allocate system resources to enable both First Core 149 and Second Core 159 to execute one or more code loads independently. In one particular embodiment, OC 112 can transfer application data, hardware data, queue, control blocks, and TCP connection state data via shared data memory; load and execute one or more new code loads in parallel on a separate Core (e.g., Second Core 159); and switchover and sync hardware to help avoid quiesce state from blocking the processing.

In one particular embodiment, OC 112 can allocate memory and Input/Output (IO) (e.g., peripheral component interconnect express (PCIe)) so both First Core 149 and Second Core 159 can be enabled to load and execute both the kernel (e.g., Kernel N 154) and the application (e.g., Application N 152) concurrently. Additionally, in this particular embodiment, OC 112 can provide one or more unique resource limits for each core in distributed data procession environment 100 that can be specified in a Device Tree Source (DTS) file, in which the memory between First Core 149 and Second Core 159 do not overlap.

In various embodiments, OC 112 can instruct Kernel N 154 to boot one or more shared memory maps into an address space for both First Core 149 and Second Core 159 and enable peripheral component interconnect (PCI) to root complex quiesce and restart the hardware and/or hardware data, via Application N 152. In various embodiments, OC 112 can run hardware queue until the switch-over from First Core 149 to Second Core 159 occurs. In various embodiments, OC 112 can switch-over at both the kernel and the user space. In various embodiments, OC 112 can enable the data distribution and checkpoint restore to share the same memory.

Figure 1B:
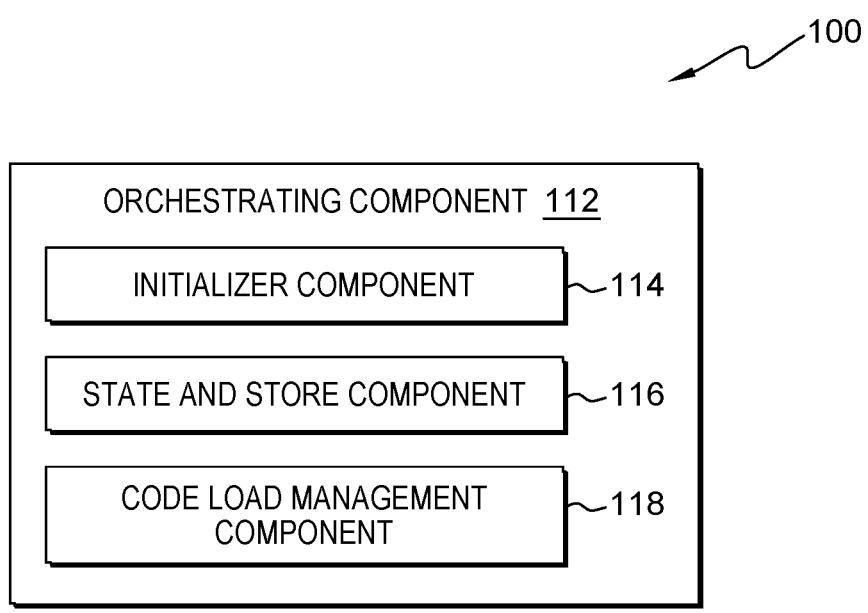
FIG. 1B is a functional block diagram illustrating an orchestrating component within the distributed data procession environment of FIG. 1A, in accordance with an embodiment of the present invention.

FIG. 1B is a functional block diagram illustrating OC 112 within distributed data procession environment 100 shown in FIG. 1A, in accordance with an embodiment of the present invention. FIG. 1B provides only an illustration of one implementation and does not imply any limitations with regard to the environments in which different embodiments can be implemented. Many modifications to the depicted environment can be made by those skilled in the art without departing from the scope of the invention as recited by the claims.

In various embodiments, Initializer Component (IC) 114, State and Store Component (SSC) 116, and Code Load Management Component (CLMC) 118 reside on OC 112. In other embodiments, not depicted in FIG. 1B, IC 114, SSC 116, and/or CLMC 118 can reside on Server Computer 120 or on any component within distributed data procession environment 100 as long as they are in communication with OC 112. In various embodiments, OC 112, via IC 114, can assign active and standby states to First Core 149 and Second Core 159 and maintain the active and standby states by instructing the old core (e.g., First Core 149) and/or the new core (e.g., Second Core 159) to store the assigned core states (e.g., assign active and standby states) in Shared Storage 124. In various embodiments, during power on, IC 114, via one or more bootloaders, can designate First Core 149 as active, fetch Code Load O 140, and start the operating system. In various embodiments, during power on, SSC 116, via a bootloader, can instruct Second Core 159 to become active and instruct First Core 149 to go into an idle loop. In various embodiments, SSC 116 can start processing client requests. In various embodiments, OC 112 can enable concurrent updates between one or more kernels and one or more applications. In various embodiments, IC 114 can trigger the concurrent update and SSC 116 can instruct Second Core 159 to retrieve one or more code loads from Code Load N 150 and boot the operating system. In various embodiments, IC 114 can trigger the concurrent update by sending a command to Second Core 159 to load a new code load (e.g., Code Load N 150).

In various embodiments, during transition from First Core 149 to Second Core 159, IC 114 can instruct Code Load O 149 running on First Core 149 to generate and read application data and hardware data from Shared Storage 124. Additionally, in various embodiments, IC 114, via concurrent patch trigger, can command Second Core 159 to load the new code load (e.g., Code Load N 150) while the old code load (e.g., Code Load O 140) is running. In various embodiments, IC 114 can send a command to Second Core 150 to load a new code load (e.g., Code Load N 150) into a second portion of memory (e.g., a second portion of Local Storage 108) and to execute the new code load. In various embodiments, executing the new code load can comprise initiating the new kernel (e.g., Kernel N 154) to boot on Second Core 159.

In various embodiments, SSC 116 can command Second Core 159 to initiate the booting of Kernel N 154. In various embodiments, SSC 116 can instruct Application O 142, via Code Load O 140, to reach a safe checkpoint state (e.g., checkpoint state) and instruct Application O 142 to save its process state and TCP connection state on Shared Storage 124, in which saving the process state comprises the old code load (e.g., Code Load O 140) transitioning to a safe checkpoint state. In one particular embodiment, SSC 116 can instruct Application O 142, via Code Load O 140, to save its states (e.g., process state and TCP connection state) on Shared Storage 124 upon reaching the safe checkpoint state (e.g., checkpoint state). In various embodiments, once the process state and the TCP connection state are saved the saved states (e.g., the process state and the TCP connection state) cannot change. In various embodiments, once Code Load O 140 reaches the safe check point and saves it's states the safe check point prohibits Code Load O 140 from processing any new operations (e.g., stops operations of the processes). In various embodiments, OC 112, via SSC 116, receives a notification that the new code load (e.g., Code Load N 150) is active and processing client requests. In various embodiments, SSC 116 enables the old code load (e.g., Code Load O 140) to terminate and to remove the old code load from a first portion of the memory (e.g., a first portion of Local Storage 108).

In some embodiments, SSC 116 can instruct Application N 152, via Code Load N 150, to read the previously saved process state and TCP connection state in Shared Storage 124. In various embodiments, CLMC 118 can instruct Application N 152, via Code Load N 150, to sync up to the hardware data in Shared Storage 124 and instruct Application N 152 to process pending queue elements. In various embodiments, CLMC 118 can instruct Code Load O to terminate Application O 142 and remove Code Load O 140 stored data from a first portion of memory (e.g., a first portion of Shared Storage 124). In various embodiments, after Application O 142 is terminated and Code Load O 140 data is removed from Shared Storage 124, CLMC 118 can instruct First Core 149 to spin in an idle loop. In various embodiments, subsequent to the transition completion from First Core 149 to Second Core 159, CLMC 118 can activate and/or enable Second Core 159 to process client requests. In various embodiments, CLMC 118 can instruct First Core 149 to stay in an idle loop (e.g., remain in a standby state) until the next concurrent update is triggered.

Figure 2:
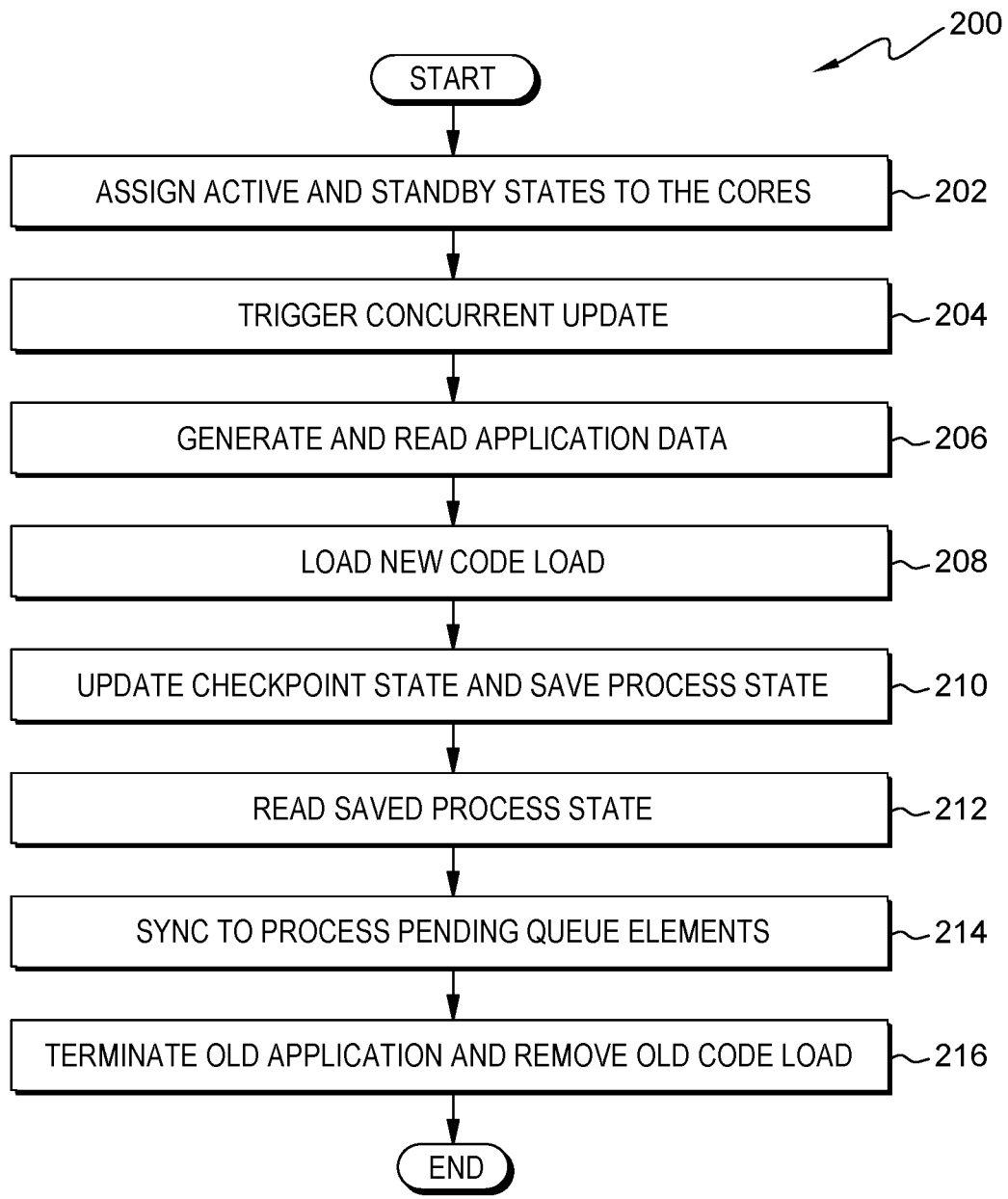
FIG. 2 is a flowchart illustrating operational steps of an orchestrating component, in communication with a server computer within the distributed data processing environment of FIG. 1A, for path-failover, in accordance with an embodiment of the present invention.

FIG. 2 illustrates operational steps of OC 112, generally designated 200, in communication with Server Computer 120 within distributed data processing environment 100 of FIG. 1 for concurrently upgrading Application O 142 and Kernel O 144 without disrupting the connected (TCP) clients, in accordance with an embodiment of the present invention. FIG. 2 provides an illustration of one implementation and does not imply any limitations with regard to the environments in which different embodiments can be implemented. Many modifications to the depicted environment can be made by those skilled in the art without departing from the scope of the invention as recited by the claims.

In step 202, OC 112 assigns active and standby states to one or more cores. In various embodiments, OC 112 can instruct IC 114 to assign active and standby states to one or more cores and store the assigned core states on the shared memory. For example, IC 114 instructs First Core 149 to be in an active state and instructs Second Core 159 to be in a standby state and stores First Core 149 active state and Second Core 159 standby state on Shared Storage 124. In another example, IC 114 assigns First Core 149 to be in a standby state and assigns Second Core 159 to an active state. In one particular example, while the operating system powers on, OC 112 can instruct IC 114 to designate First Core 149 as active, retrieve the code load, and the launch operating system, via one or more bootloaders. In this particular example, SSC 116, via one or more bootloaders, assigns Second Core 159 to a standby state and instructs Second Core 159 to run in an idle loop. Furthermore, in this particular example, SSC 116 instructs and/or enables First Core 149 to process client requests.

In step 204, OC 112 triggers concurrent update for one or more applications and one or more kernels on an operating system. In various embodiments, OC 112 instructs IC 114 to trigger the concurrent update between one or more applications and one or more kernels. In various embodiments, IC 114 can instruct Second Core 159 to retrieve a new code load (e.g., Code Load N 150) to upgrade the current code load (e.g., Code Load O 140) on the operating system, and instruct Second Core 159 to boot the operating system. In various embodiments, OC 112 can instruct Kernel N 154 to boot one or more shared memory maps, stored on Shared Storage 124, into an address space for both First Core 149 and Second Core 159, and enable PCI to root complex quiesce and restart the hardware and/or hardware data, via Application N 152. In various embodiments, OC 112 can run hardware queue until the switch-over from First Core 149 to Second Core 159 occurs. In various embodiments, OC 112 can switch-over at both the kernel and the user space.

In step 206, OC 112 instructs the old code load to generate and read the application data and/or hardware data. In various embodiments, OC 112 can direct IC 114 to instruct the old code load running on First Core 149 to generate and read application data and/or hardware data. For example, IC 114 can instruct Code Load O 140 to generate and read application data and/or hardware data.

In step 208, OC 112 instructs new core (Second Core 159) to load one or more new code loads in parallel with the one or more old code loads running on a first core. In various embodiments, OC 112 can command Second Core 159 to initiate one or more new kernel boots on a second core. In various embodiments, during a concurrent patch trigger, OC 112, via IC 114, can instruct Second Core 159 to simultaneously load Code Load N 150 while Code Load O 140 is running on First Core 149. In various embodiments, IC 114 can command Second Core 159 to initiate Kernel N 154 boot. In various embodiments, OC 112 can instruct Second Core 159 to load one or more new code loads while the first core simultaneously runs the one or more old code loads. In various embodiments, OC 112 can send a command to Second Core 159 to load a new code load (Code Load N 150) into Local Storage 108 and command Second Core 159 to execute the new code load.

In step 210, OC 112 instructs one or more old applications to update the safe checkpoint state and instructs the one or more old applications save the process state and TCP connection state on the shared data memory. In various embodiments, OC 112 can instruct an old code load (e.g., Code Load O 140), executing on First Core 149, to save the old code loads process state and TCP connection state in the Shared Storage 124. In various embodiments, SSC 116 can queue Application N 152. In various embodiments, OC 112, via SSC 116, can instruct Application O 142, via Code Load O 140, to reach and update a safe checkpoint state and instruct Application O 142 to save its process state and TCP connection state on Shared Storage 124. In one particular embodiment, SSC 116 can instruct Application O 142 to save its process state and TCP connection state on Shared Storage 124 upon reaching the safe checkpoint state, in which saving the process state comprises the old code load transitioning to a safe checkpoint state. In various embodiments, SSC 116 can instruct Application O 142 to stop processing data and/or queues. In other embodiments, SSC 116 can instruct Code Load O 140 to restrict Application O 142 from processing data and/or queue elements.

In step 212, OC 112 instructs one or more new applications to read the previously saved process state and TCP connection state. In various embodiments, OC 112, via CLMC 118, can instruct Code Load N 150 to enable Application N 152 to read the process state and TCP connection state saved in Shared Storage 124 and initialize Application N to these states. In various embodiments, OC 112 receives a notification from Code Load N 150 that the new code load is active and processing client requests. In step 210. In various embodiments, OC 112 enables the switchover of one or more clients from one or more old servers to one or more new servers. For example, OC 112 enables the switchover of client connection and communication from First Core 149 to Second Core 159.

In step 214, OC 112 instructs the new application to sync to process pending queue elements. In various embodiments, OC 112 instructs one or more new applications, via Code Load N, to sync to one or more process pending queue elements. In various embodiments, OC 112, via CLMC 118, can instruct Application N 152 to sync to one or more process pending queue elements in Shared Storage 124.

In step 216, OC 112 terminates the old application and removes the old code load from storage. In various embodiments, OC 112 can instruct Code Load O 140, via CLMC 118, to terminate one or more old applications from one or more code loads. In various embodiments, CLMC 118 can instruct Application O 142 to terminate, via Code Load 140, and to remove Code Load O 140 data from a first portion of Local Storage 108 and/or Shared Storage 124. In various embodiments, after Application O 142 is terminated and Code Load O 140 is removed from a first portion of Local Storage 108 then CLMC 118 can instruct First Core 149 to spin in an idle loop.

Figure 3:
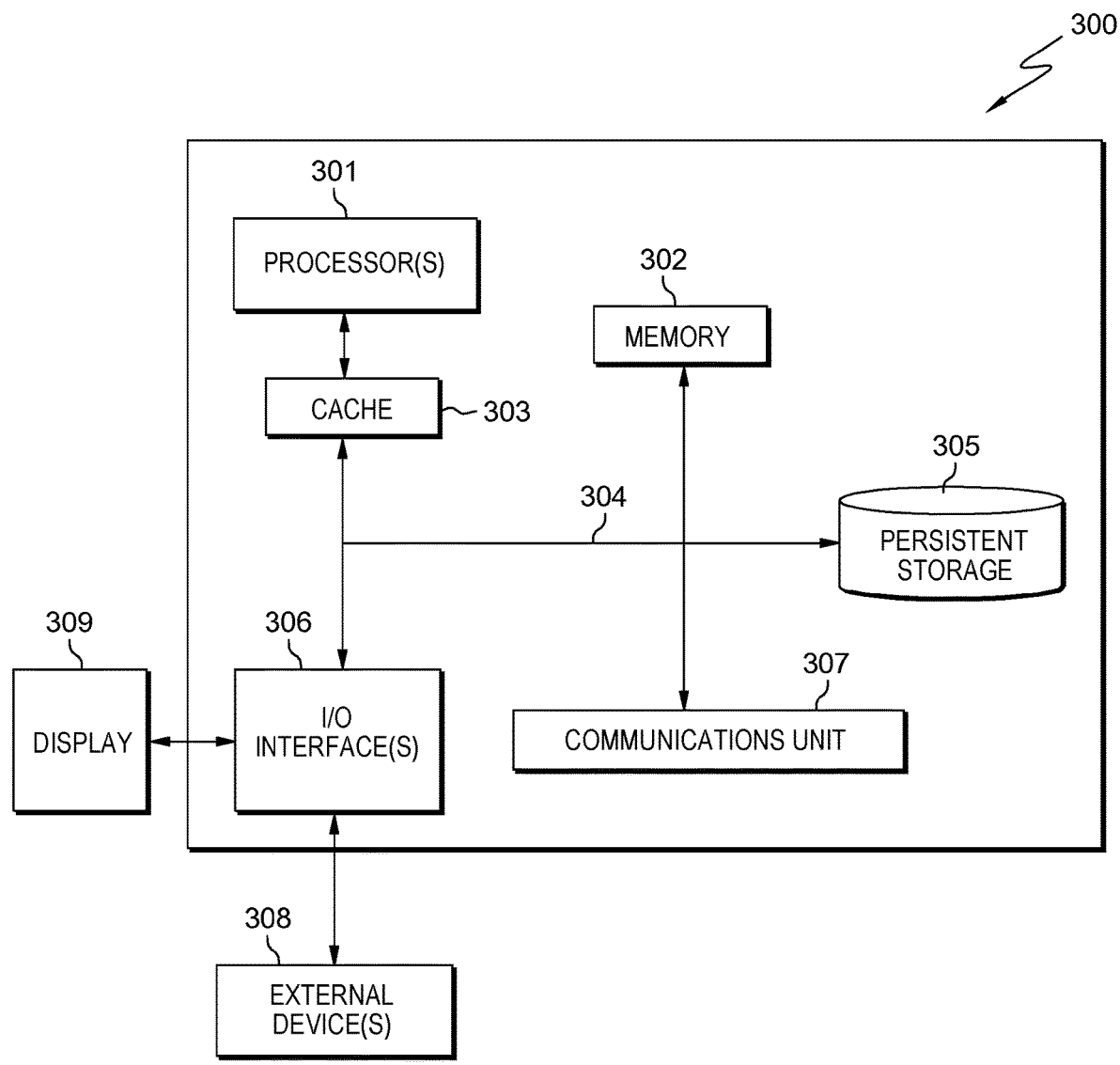
FIG. 3 depicts a block diagram of components of a computing device and a server computer executing the orchestrating component within the distributed data processing environment of FIG. 1A, in accordance with an embodiment of the present invention.

FIG. 3 depicts computer system 300, where Server Computer 120 represents an example of computer system 300 that includes OC 112. The computer system includes processors 301, cache 303, memory 302, persistent storage 305, communications unit 307, input/output (I/O) interface(s) 306, display 309, external device(s) 308 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications, and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention can be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 305 can also be removable. For example, a removable hard drive can be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 can provide communications through the use of either or both physical and wireless communications links. Program instructions and data used to practice embodiments of the present invention can be downloaded to persistent storage 305 through communications unit 307.

I/O interface(s) 306 enables for input and output of data with other devices that can be connected to each computer system. For example, I/O interface 306 can provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product. The computer program product can include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, a segment, or a portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for improving application upgrade by minimizing blackout time for a single partition kernel, the method comprising:
    sending, by an orchestrator, a command to a second core to load a new code load into a second portion of a memory and to execute the new code load;
    instructing, by the orchestrator, an old code load, executing on a first core, to save a process state and transmission control protocol (TCP) connection state in a shared memory, wherein saving the process state comprises the old code load transitioning to a safe checkpoint state;
    instructing, by the orchestrator, the new code load to read the process state and the TCP connection state from the shared memory, and initialize a new application to the process state and the TCP connection state read from the shared memory;
    executing the new code load on the second core in parallel with the old code load on the first core;

receiving, by the orchestrator, a notification from the new code load that the new code load is active and processing client requests;

instructing, by the orchestrator, the old code load to terminate; and removing, by the orchestrator, the old code load from a first portion of the memory.

2. The method of claim 1, wherein the new code load comprises a new application and a new kernel and the old code load comprises an old application and an old kernel.

3. The method of claim 1, wherein executing the new code load comprises initiating a new kernel boot on the second core.

4. The method of claim 1 further comprising:
assigning, by the orchestrator, an active and standby states to the first core and the second core; and
instructing, by the orchestrator, the first core and the second core to store the assigned core states in the memory.

5. The method of claim 1, wherein removing the old code load further comprises the first core entering an idle loop until instructed to update a next code load.

6. The method of claim 1 further comprising:
instructing, by the orchestrator, the new code load to synchronize to process pending queue elements.

7. A computer program product for improving application upgrade by minimizing blackout time for a single partition kernel, the computer program product comprising:
one or more computer readable storage medium and program instructions stored on the one or more computer readable storage medium, wherein the computer readable storage medium is not a transitory signal per se. the stored program instructions comprising:
program instructions to send a command to a second core to load a new code load into a second portion of a memory and to execute the new code load;
program instructions to instruct an old code load, executing on a first core, to save a process state and transmission control protocol (TCP) connection state in a shared memory, wherein saving the process state comprises the old code load transitioning to a safe checkpoint state;
program instructions to instruct the new code load to read the process state and the TCP connection state from the shared memory and initialize a new application to the process state and the TCP connection state read from the shared memory;
program instructions to execute the new code load on the second core in parallel with the old code load on the first core;
program instructions to receive a notification from the new code load that the new code load is active and processing client requests;
program instructions to instruct the old code load to terminate; and
program instructions to remove the old code load from a first portion of the memory.

8. The computer program product of claim 7, wherein the new code load comprises a new application and a new kernel and the old code load comprises an old application and an old kernel.

9. The computer program product of claim 7, wherein executing the new code load comprises initiating a new kernel boot on the second core.

10. The computer program product of claim 7 further comprising:
program instruction to assign an active and standby states to the second core and the first core; and
program instructions to instruct the second core and the first core to store the assigned core states in the memory.

11. The computer program product of claim 7, wherein removing the old code load further comprises the first core entering an idle loop until instructed to update a next code load.

12. The computer program product of claim 7 further comprising:
program instructions to instruct the new code load to synchronize to process pending queue elements.

13. A computer system for improving application upgrade by minimizing blackout time for a single partition kernel, the computer system comprising:
one or more computer processors;
one or more computer readable storage devices;
program instructions stored on the one or more computer readable storage devices for execution by at least one of the one or more computer processors, the stored program instructions comprising:
program instructions to send a command to a second core to load a new code load into a second portion of a memory and to execute the new code load;
program instructions to instruct an old code load, executing on a first core, to save a process state and transmission control protocol (TCP) connection state in a shared memory, wherein saving the process state comprises the old code load transitioning to a safe checkpoint state;
program instructions to instruct the new code load to read the process state and the TCP connection state from the shared memory and initialize a new application to the process state and the TCP connection state read from the shared memory;
program instructions to execute the new code load on the second core in parallel with the old code load on the first core;
program instructions to receive a notification from the new code load that the new code load is active and processing client requests;
program instructions to instruct the old code load to terminate; and
program instructions to remove the old code load from a first portion of the memory.

14. The computer system of claim 13, wherein the new code load comprises a new application and a new kernel and the old code load comprises an old application and an old kernel.

15. The computer system of claim 13 further comprising:
program instruction to assign an active and standby states to the second core and the first core; and
program instructions to instruct the second core and the first core to store the assigned core states in the memory.

16. The computer system of claim 13, wherein removing the old code load further comprises the first core entering an idle loop until instructed to update a next code load.

17. The computer system of claim 13 further comprising:
program instructions to instruct the new code load to synchronizing to process pending queue elements.

* * * * *